Jan. 29, 1957 C. F. SMITH 2,779,145
TRACTOR MOUNTED MOWER
Filed Sept. 12, 1952 5 Sheets-Sheet 1

INVENTOR.
CARLISLE F. SMITH
BY
ATTORNEY

Jan. 29, 1957 C. F. SMITH 2,779,145
TRACTOR MOUNTED MOWER
Filed Sept. 12, 1952 5 Sheets-Sheet 2

INVENTOR.
CARLISLE F. SMITH
BY
ATTORNEY

Jan. 29, 1957  C. F. SMITH  2,779,145
TRACTOR MOUNTED MOWER
Filed Sept. 12, 1952  5 Sheets-Sheet 4

INVENTOR.
CARLISLE F. SMITH
BY
ATTORNEY

United States Patent Office 2,779,145
Patented Jan. 29, 1957

2,779,145

TRACTOR MOUNTED MOWER

Carlisle F. Smith, Knoxville, Ill., assignor to J. I. Case Company, Racine, Wis., a corporation of Wisconsin Application September 12, 1952, Serial No. 309,274

6 Claims. (Cl. 56—25)

The present invention relates to a new and improved implement such as a mower and has for one of its principal objects the provision of a mower capable of both horizontal and vertical movement and a lifting mechanism for effecting vertical movement while horizontal movement is permitted without disconnecting or otherwise interfering with the lifting mechanism for the vertical movement of the mower.

Another object of the present invention is to provide a lifting mechanism for a mower of the type interconnected with a tractor by means of a draft and lifting linkage, the lifting mechanism of the mower being actuated for vertically swinging the mower upon moving of the draft and lifting linkage into a raised position.

Another object of the present invention is to provide a lifting mechanism for effecting swinging of the mower through its vertical range of adjustment while still allowing rearward horizontal swinging of the mower upon striking an obstruction without actually unlocking or disconnecting anything between the lifting mechanism and the mower, and which immediately upon the return of the mower to its normal operative position is automatically re-engaged for effecting swinging of the mower through its vertical range of movement.

A still further object of the present invention is to provide a mower having a main supporting frame and a mower assembly, the main supporting frame being in the form of a rigid sheet metal plate, the crank and pitman for effecting reciprocating movement of the sickle bar assembly being positioned in substantially coplanar relationship with respect to said plate so that the thrust reaction caused by the rapid reversal of the pitman and sickle is imposed upon said plate by said pitman and is readily absorbed and dissipated and not transmitted to the tractor.

Other and further objects of this invention will become apparent from the following specification and accompanying drawings in which.

Figure 1:
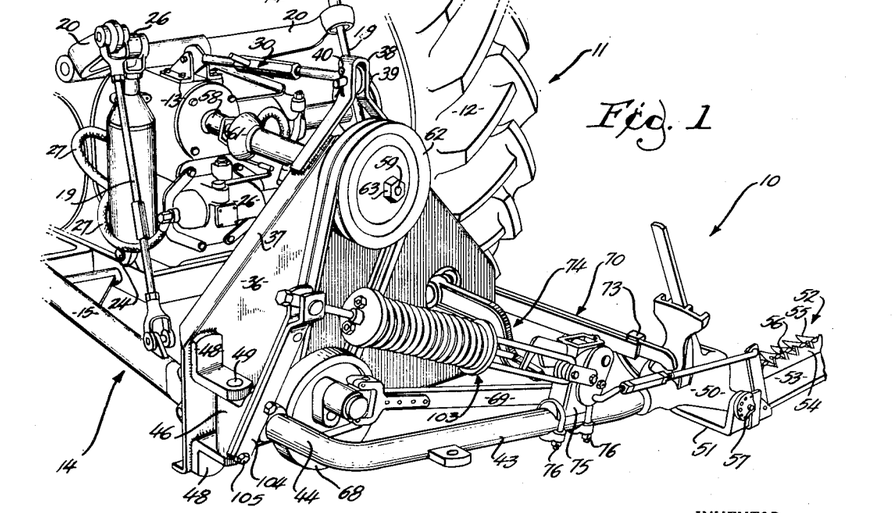
Fig. 1 is a fragmentary left-rear elevational view of a tractor-mounted mower embodying the present invention shown in combination with a tractor, with parts removed, the mower being in its proper operational position with respect to the horizontal.
Figure 2:
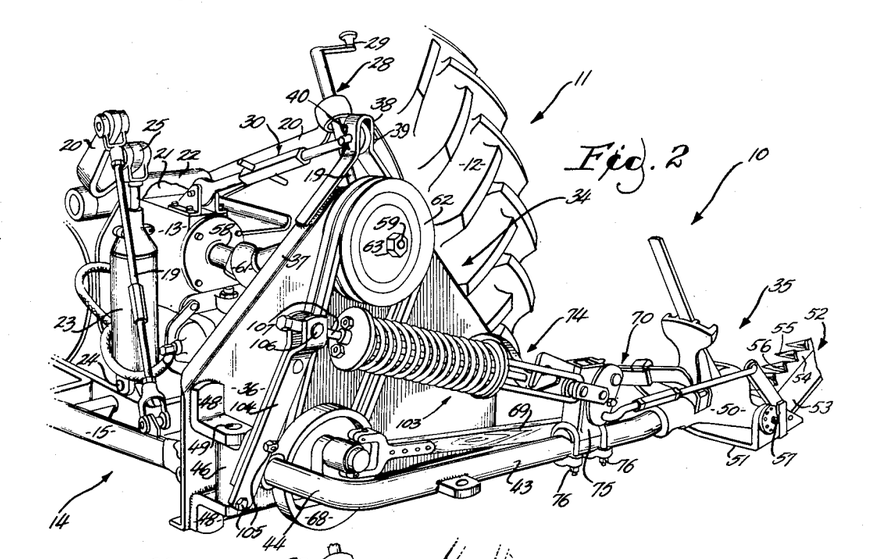
Fig. 2 is a view similar to Fig. 1 showing the combination wherein the mower is in a vertically inclined position with respect to the horizontal.
Figure 3:
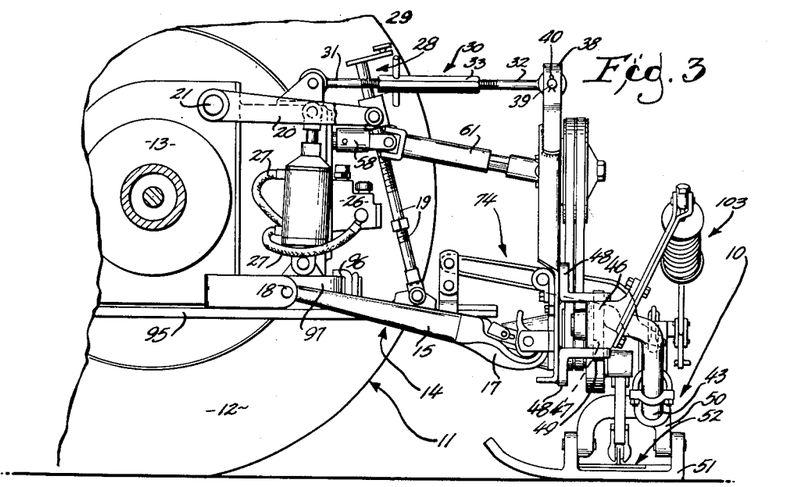
Fig. 3 is a left-side elevational view of the structure shown in Fig. 1, with parts removed or broken away to more clearly show details in construction.
Figure 4:
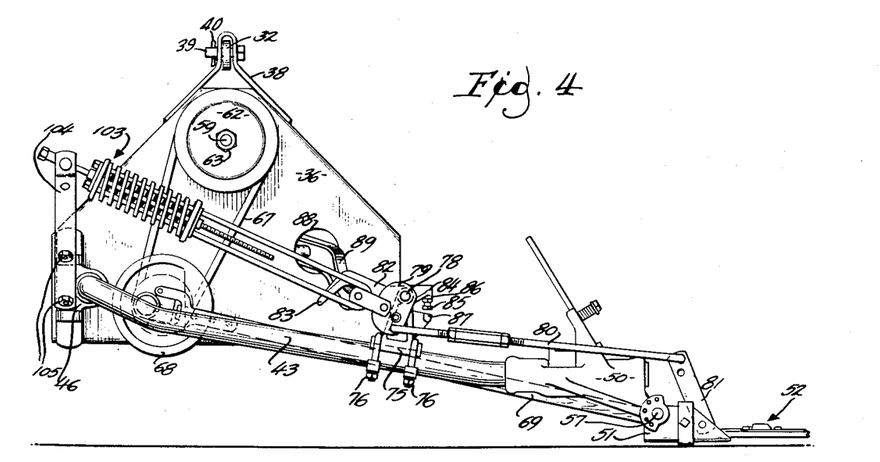
Fig. 4 is a rear elevational view of the structure shown in Fig. 3, with parts removed.
Figure 5:
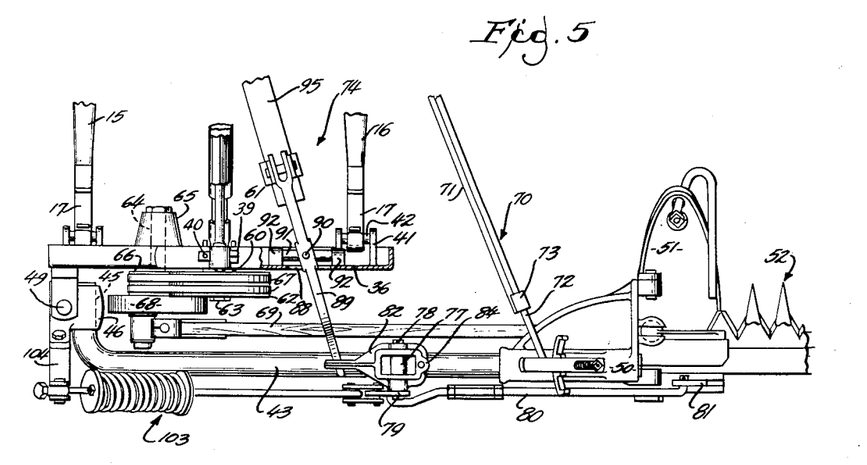
Fig. 5 is a plan view of the structure shown in Fig. 3, with parts removed, and with parts broken away and shown in section to more clearly show details in construction.

The present invention is shown as being embodied in a tractor mounted mower, generally designated by the number 10, which is shown in Figs. 1, 2, and 3 in combination with a tractor 11 of any suitable or conventional construction, only a portion of the tractor being visible in the drawings. The tractor 11 comprises in the present instance suitable rear traction wheels 12, only one of which is visible, which are carried on the opposite ends of a rear axle assembly, generally designated as 13. The tractor also includes front supporting wheels, an engine and transmission unit, a steering mechanism, and an operator's seat. However, since all of the above mentioned structures are capable of being of any well-known or suitable construction, and since the details of these structures are of no importance with respect to the present invention, they have been omitted from the drawings. The tractor 11 is also provided in the present instance with a draft and lifting linkage 14 which includes a pair of rearwardly extending draft arms 15 and 16, see also Fig. 5, which are provided adjacent their rearward ends with suitable hooks or attaching claws 17. The draft arms 15 and 16 are forwardly connected to the rear axle assembly 13 so as to be swingable about a transverse axis by means of suitable pivot pins 18, and links 19 are interconnected between the respective draft arms 15 and 16 and a pair of rearwardly extending substantially parallel rock arms 20. The rock arms 20 are fixed to the opposite ends of a rock shaft 21 which is journaled in a suitable housing 22 formed as a part of the rear axle assembly 13. The rock shaft 21 is rockable in response to the force of a hydraulic power motor 23, the power motor 23 being anchored to some convenient part of the tractor as at 24 and to a rock arm 25 extending rearwardly adjacent one end of the rock shaft 21. A suitable hydraulic power system of any conventioinal or well known construction is incorporated in the tractor 11 and includes a suitable valve mechanism 26, the opposite ends of which are connected to the opposite ends of the power motor 23 by means of suitable conduits 27. It will be appreciated therefore that the expansion of the power motor 23 will cause the rock shaft 21 to revolve so as to swing the respective draft arms 15 and 16 upwardly about their respective transverse axes in response to upward swinging movement of the rock arms 20. It will also be appreciated that the draft arms 15 and 16 are biased by their weight and that of attached parts to swing downwardly, and that this downward swinging movement of the draft arms 15 and 16 is limited only by the resistance to contraction of the power motor 23. One of the connecting links 19 is in the form of an adjustable screw 28 of well known type which has a handle 29 positioned in close proximity to the rear axle assembly 13 of the tractor so that the operator from his position on the tractor can swing one of the draft arms about its transverse axis relative to the other.

A middle link 30 is swingably carried by the tractor 11 substantially between and above the draft arms 15 and 16 so that an implement carried by the draft arms 15 and 16 and the middle link 30 can be moved from an operative to an inoperative position in a manner well known in the art and in a substantially vertically direction. The middle link 30 in the present instance is in the form of a turn-buckle which includes a pair of threaded elements 31 and 32 which are threadedly received by a center element 33 so that the middle link can be lengthened or shortened in response to rotative movement of the center element 33 in a manner well known in the art.

Figure 6:
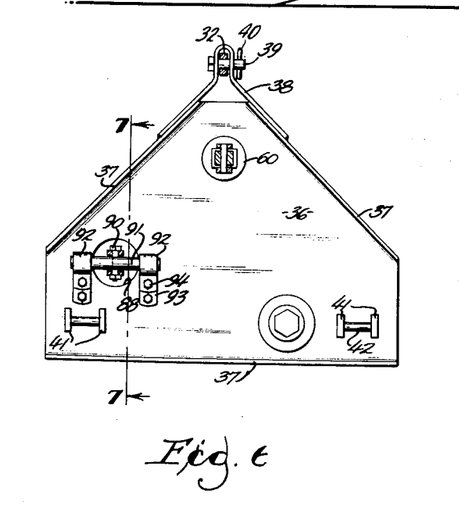
Fig. 6 is a front view of the main supporting frame of the mower embodying the present invention, with parts broken away and shown in section.
Figure 7:
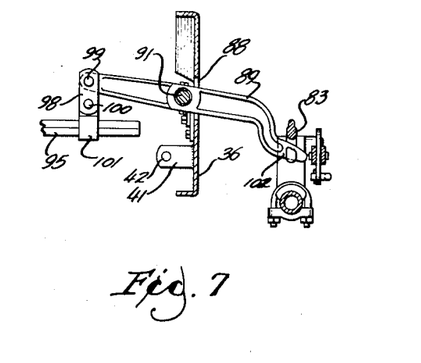
Fig. 7 is a cross-sectional view taken on the line 7—7 of Fig. 6, with parts removed.

The mower 10 comprises in the present instance a main supporting frame 34 and a mower assembly 35, the mower assembly 35 being vertically and horizontally swingably carried by the main supporting frame 34 as will be more clearly described hereinafter. The main supporting frame 34 is in the form of a rigid sheet metal plate 36, preferably heavy boiler plate or sheet metal of a similar rigidity, which is substantially triangular in shape, the upper surfaces thereof converging upwardly toward the apex thereof, see also Fig. 6. Plate 36 is in the form of a channel construction having a forwardly extending flange 37 on each of the upper and lower margins thereof, and a suitable mast structure 38 is welded or otherwise fixed to the flanges 37 on the upper edge of the plate 36 so as to extend upwardly therefrom adjacent the apex thereof. The mast structure 38 is suitably apertured adjacent the upper end thereof so that when the threaded element 32 of the middle link 30 is received by the mast structure 38, a lock pin 39 can be inserted in the apertures formed in the mast structure 38 and in an aperture formed adjacent the rearward end of the element 32 of the middle link 30. A suitable cotter pin 40 or like structure is provided for locking the pin 39 against axial displacement in the apertures formed in the element 32 and the mast structure 38 in a manner well known in the art. Pairs of forwardly extending brackets 41 are welded forwardly to the plate 36 on opposite sides thereof and adjacent the lower surface thereof and in spaced relationship, and a suitable pin 42 is carried between each pair of brackets 41 so as to provide suitable attaching means for the hooks 17 of the draft arms 15 and 16. The main frame 34 is carried in a substantially vertical position with respect to the ground by means of the draft arms 15 and 16 and the middle link 30, and owing to the extreme rigidity of the plate 36, the side thrust imposed thereupon by the operation of the mower assembly 35 is readily absorbed and dissipated by the substantial mass of the plate and consequently not transmitted to the tractor 11. This feature of the present invention will be more clearly described and pointed out hereinafter.

The mower assembly 35 includes a drag bar 43 having a forwardly extending portion 44 which is journaled in a fore-and-aft extending bore 45 formed in a casting 46. The casting also has formed therein a vertical bore 47, and the plate 36 of the main supporting frame 34 adjacent the left side thereof has secured thereto as by welding or the like a pair of rearwardly extending vertically spaced supporting brackets 48. The supporting brackets 48 are so spaced as to receive therebetween the casting 46, and suitable apertures are formed in the supporting brackets 48 so as to receive therein and in the vertical bore 47 of the casting 46 a substantially vertical pivot pin 49, about the axis of which the mower assembly 35 swings when the mower assembly is moved into a "break-away" position. Adjacent the right end of the drag bar 43 is carried a yoke 50 of any suitable or well known construction which yoke supports adjacent the lateral end thereof an inner shoe 51 of a cutter bar assembly 52, the cutter bar assembly 52 being of any well known or suitable construction and comprising in the present instance a support bar 53, a sickle bar assembly 54, a plurality of spaced forwardly extending guards 55, and ledger plates 56 positioned in shearing relationship with respect to the sickle bar assembly 54, an outer shoe of any well known or suitable construction, not shown, being preferably carried adjacent the grain or lateral end of the cutter bar assembly for well known purposes. The inner shoe 51 of the cutter bar assembly is swingably connected to the yoke 50 by means of a substantially fore-and-aft pivot pin 57 so that the cutter bar assembly 52 is capable of vertical swinging movement about the axis of pivot pin 57 into an inoperative position as will be more fully explained hereinafter.

The tractor 11 is provided with a rearwardly extending power take-off shaft 58, and a fore-and-aft extending driving shaft 59 is rotatably carried in a suitable bearing 60 fixed to the plate 36 substantially in rearward alignment with the power take-off shaft 58 when the cutter bar assembly 52 is in operative position with respect to the ground. A universal telescoping shaft 61 of any well known or suitable construction, is drivingly interconnected between the power take-off shaft 58 and the driving shaft 59 forwardly of the plate 36. The driving shaft 59 extends rearwardly of the plate 36 and has fixed adjacent the rearward end thereof a double-face driving pulley 62, a lock nut 63 being threadedly received on the rearward end of the driving shaft 59 for locking pulley 62 in its proper axial position on the shaft 59. A driven shaft 64 is suitably rotatably supported in a housing 65 fixed to the plate 36 downwardly and slightly to the left of the driving shaft 59, the driven shaft 64 extending in a substantially fore-and-aft direction in parallelism with respect to driving shaft 59. The driven shaft 64 extends rearwardly of the plate 36 and a double-face driven pulley 66 is drivingly fixed thereto in substantially vertical alignment with respect to the driving pulley 62 of the shaft 59. A pair of V-belts 67 are received by the respectivce driving and driven pulleys 62 and 66, and a crank 68 is fixed to the rearward extremity of the driven pulley 66 in any suitable manner. The crank is connected to one end of a pitman 69 in any well known or suitable manner and the other end of the pitman 69 is connected to the sickle bar assembly 54 so that rotation of the crank 68 will effect a reciprocating motion of the pitman 69 and consequently of the sickle bar assembly 54 which as previously suggested works in shearing relationship with respect to the ledger plates 56 in a manner well known in the art. It will be noted that the driving pulley 62 and the driven pulley 66 are positioned in close proximity to the plate 36, and it will be further noted that the crank 68 is also positioned in close proximity to the plate 36 so that the thrust reaction imposed upon the crank 68 by the pitman 69 in changing its direction of movement and that of the sickle bar, is directed in a plane substantially coplanar with respect to the plate 36, and, as previously suggested, the extreme rigidity and substantial mass of the plate 36 tends to absorb this vibratory shock imposed thereupon, the tractor and the draft and lifting linkage consequently not being unduly shaken during the operation of the mower.

The drag bar 43 is held in its operative position with respect to the direction of travel of the tractor by means of an extensible rod assembly 70 which is interconnected between the tractor 11 and the yoke 50. The extensible rod assembly can be of any well known or suitable design and comprises in the present instance a pair of rods 71 and 72 in slidable relationship with respect to one another and a latch means, not visible in the drawings, of any suitable or well known construction carried by one of the rods for draft engaging a draft pin, also not visible in the drawings, carried by the other of the rods. The rods 71 and 72 are held in nonextensible relationship by means of the latch during all normal operating conditions. However, when an excessive force is exerted against the cutter bar assembly 52 sufficient to swing the mower assembly 35 rearwardly into a "break-away" position, such as when the cutter bar assembly strikes an obstruction, such as a large stone or a tree trunk for instance, the force exerted tending to extend the extensible rods 71 and 72 is sufficient to release the latch in a manner well known in the art, suitable stops 73, only one of which is visible, being provided on the respective bars 71 and 72 for limiting the rearward swinging movement of the mower assembly 35 to a predetermined angle when the respective stops are moved into abutting relationship as well known in the art.

A lifting mechanism 74 is provided for effecting vertical swinging of the cutter bar assembly 52 in advance of the drag bar 43, and of the drag bar 43 when the cutter bar 52 has been moved a predetermined distance into a vertically inclined position with respect to the yoke 50 of the drag bar. This lifting mechanism 74 comprises in the present instance a standard 75 carried on the drag bar 43 by means of suitable straddle bolts or the like 76. The standard 75 provides a bearing 77 which rotatably carries therein a rockable member in the form of a rock shaft 78 in the present instance, the rock shaft 78 being rockable about a substantially fore-and-aft axis. A rock arm 79 is fixed adjacent the rearward end of the rock shaft 78 and is connected by means of a suitable link 80 to an arm 81 suitably connected to the inner shoe 51 of the cutter bar assembly, the arm 81 being so constituted as to effect swinging of the cutter bar assembly 52 in a vertically inclined position about the axis of pivot pin 57 in response to rocking of said rock shaft in a lifting direction sufficiently to place the link 80 in tension. For effecting rocking of the rock shaft 78 in a lifting direction, a yoke-like rock arm or lifting arm 82 is fixed to the rock shaft 78 receiving within itself bearing 77 and is so positioned as to extend to the left thereof. This second rock shaft 82 has a hook receiving portion 83 formed adjacent the left end thereof, and adjacent the other end thereof an abutment element 84, which in the present instance has a bolt 85 threaded into an aperture formed in a boss 86 formed on the rock arm 82, is positioned in the plane of a stop 87 formed on the standard 75 so that when the rock shaft 78 is rocked in a lifting direction a predetermined amount, the abutment element 84 will be moved into abutting relationship with respect to the stop 87 so as to prevent further rocking in a lifting direction of the rock shaft 78. The foregoing assemblage of parts is commonly known in the trade as gag mechanism, and as will be apparent, continued lifting force on arm 82 after bolt 85 contacts stop 87 will cause raising of drag bar 43. An opening 88 is formed in the plate 36 of the main supporting frame, and a lifting lever 89 extends rearwardly through the opening 88. The lifting lever 89 is fulcrumed about the axis of a substantially vertical pin 90 (Fig. 6) which is carried by a transverse pin 91, and the transverse pin 91 is journaled in suitable bearings 92 carried by forwardly extending brackets 93 fixed to the plate 36 on opposite sides of the opening 88 as by bolts or the like 94. The lifting lever 89 is therefore fulcrumed about a substantially vertical axis for side to side swinging movement and about a transverse axis for up and down swinging movement.

The tractor 11 is provided with a rearwardly extending drawbar 95 of any well known construction which is conveniently secured forwardly to the tractor for side to side swinging movement. The drawbar 95 is provided with a guide 96 which is positioned in cooperating relationship with respect to an arcuate locking plate 97, and a suitable pin or the like, not visible in the drawings, is provided for locking the drawbar against swinging movement in various rearwardly extending positions with respect to the fore-and-aft axis of the tractor in a manner well known in the art. The forward end of the lifting lever 89 is pivotally connected to a link 98 by means of a suitable pivot pin 99, and the link 98 is pivotally connected by means of a pin 100 to a suitable strap 101 which is adapted to be rigidly secured to the drawbar 95 adjacent the rearward end thereof so that upon upward movement of the plate 36 by means of movement of the rock shaft 21 and rock arms 20 in a manner as previously described, the rearward end of the lifting lever 89 will be swung upwardly in a lifting direction about the axis of the pin 99. The lifting lever 89 is so proportioned that the distances from the axis of the pin 99 to the axis of the transverse pin 91, and the distance from the transverse pin 91 to the rearward end of the lifting lever 89 are substantially equal so that the rearward end of the lifting lever 89 will move vertically a distance equal to substantially twice the distance moved by the plate 36 which as will be more fully appreciated hereinafter permits the cutter bar assembly 52 and the drag bar 43 to be moved into a raised position upon upward movement of the plate 36 a distance which is not sufficient to cause excessive angling of the universal shaft 61. The rearward end of the lifting lever 89 is in the form of a lifting hook 102, and the hook receiving portion 83 of the rock arm 82 is positioned in the path of travel of the lifting hook 102 so that upon the main supporting frame's being moved sufficiently into a raised position, the lifting lever 89 will be swung in a lifting direction about the axis of the pin 99 sufficiently to move the lifting hook 102 into abutment with the hook receiving portion 83 of the rock arm 82. Upon further movement of the main supporting frame 34 into a raised position, the lifting lever 89 will be moved in a lifting direction sufficiently to rock the rock arm 82 and consequently the rock shaft 78 in a lifting direction. When said rock shaft 78 is rocked in a lifting direction, the rock arm 79 will be rocked in a corresponding direction and will exert sufficient tension on the link 80 to move the cutter bar assembly 52 into a vertically inclined position about the axis of pivot pin 57, the amount of swinging movement imparted to the cutter bar assembly 52 being determined by the extent that the rock shaft 78 is rocked in a lifting direction, and this in turn being determined by the extent to which the main supporting frame 34 is moved toward a raised position by means of the draft and lifting linkage 14. When the rock arm 82 is rocked in a lifting direction sufficiently to move the abutment element 84 and, specifically screw 85 into abutting relationship with the stop 87, further rocking of the rock shaft 78 in a lifting direction is prevented, and further swinging of the lifting lever 89 in a lifting direction will effect vertical swinging of the drag bar 43 about the axis of the bore 45 formed in the casting 46. The elements of the lifting mechanism in the present instance are so proportioned that the outer shoe of the cutter bar assembly 52 will be moved in a vertical direction substantially 18 inches before the abutment element 84 is moved into abutting relationship with the stop 87. Further rocking of the lifting lever 89 by means of vertical swinging movement of the main supporting frame 34 upwardly will effect in the present instance upward swinging movement of the drag bar 43 sufficiently to move the yoke 50 a distance substantially equal to 12 inches from the surface of the ground. It will be appreciated that the outer shoe of the cutter bar assembly 52 is moved upwardly before the inner shoe 51 so that the cutter bar assembly is positioned in a vertically inclined position with respect to the ground before the drag bar 43 is moved into its vertically inclined position.

While I have proportioned the elements of the lifting mechanism 74 so as to effect vertical swinging movement of the outer shoe in advance of the inner shoe a distance equal to substantially 18 inches as previously suggested and of the inner shoe, upon continued lifting movement's being imparted to the main supporting frame, a distance equal to substantially 12 inches as previously suggested, I do not intend thereby to limit the lifting mechanism to a structure wherein only this relationship between the element of the lifting mechanism exists. It will be readily appreciated that the principles of the present invention can be utilized for raising the outer shoe in advance of the inner shoe to any desired distance before the inner shoe is raised and also for raising the inner shoe to any desired height or distance.

It will be noted that, at all times when the mower is not being lifted or held in a raised position, there is no mechanical connection between the lifting lever 89 and the rock arm 82 so that in operation the mower assembly 35 is capable of being swung rearwardly into a "break-away" position without any mechanical disconnection occurring between the lifting lever and the rock arm, or between the main supporting frame and the mower assembly. After a "break-away" has occurred, the mower assembly 35 can be easily and readily repositioned in its proper operative position with respect to the main supporting frame 34, and this is effected by the operator's backing the tractor sufficiently to position the mower assembly 35 in its proper operative position with respect to the main supporting frame, the extensible rods 70 and 72 sliding with respect to one another sufficiently to become draft connected by means of the latch in the manner previously described, the main supporting frame 34 in mowing position being lowered sufficiently to present the lifting hook 102 below the hook receiving portion 83 of the rock arm 82. Then when the main supporting frame 34 is moved into a raised position, the lifting lever 89 will be rocked in a lifting direction sufficiently to move the lifting hook 102 into abutting relationship with the hook receiving portion 83 and any further adjustment of the cutter bar assembly 52 into a vertically inclined position can then be accomplished by further lifting movement of the main supporting frame 34 so as to rock the lifting lever 89.

Figure 8:
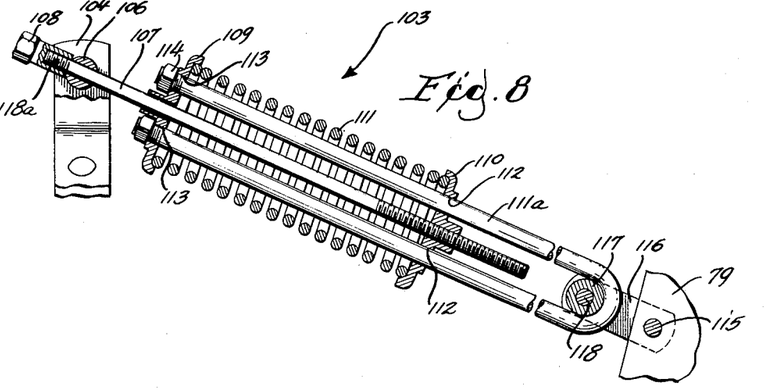
Fig. 8 is an enlarged fragmentary view, slightly enlarged, of the counterbalancing arrangement with parts removed.

The mower assembly 35 is sufficiently counterbalanced to position the cutter bar assembly 52 in floating relationship with respect to the ground when the mower assembly is in its proper operative position with respect to the horizontal. This is effected in the present instance by employing a counterbalancing arrangement designated by the number 103. This counterbalancing arrangement comprises in the present instance an upwardly extending standard 104 which is rigidly secured to the casting 46 as by suitable bolts or the like 105. A suitable trunnion 106 is rotatably carried by the standard 104 adjacent the upper end thereof and a rod 107 is journaled in the trunnion 106 and prevented from moving axially with respect thereto in one direction by means of a threaded cap 108, see Fig. 8, the rod 107 being swingable about the axis of the trunnion 106 which in turn is substantially parallel with the axis of swingable movement of the drag bar 43. A spring seat 109 is slidably received on the rod 107 and a spring seat 110 is threadedly received on the threaded end portion of the rod 107. A compression spring 111 is confined between the spring seat 109 and the spring seat 110, the compressive force of the spring 111 urging the spring seat 109 away from the spring seat 110. A connecting element 111a, in the form of an elongated U-bolt, is slidably received in apertures 112 formed in the spring seat 110 and in apertures 113 formed in spring seat 109, and suitable nuts 114 are threaded on the ends of the element 111a which protrude through the spring seat 109. The rock arm 79 has swingably connected thereto as by a pin or the like 115 a connecting link 116, and the connecting link 116 carries adjacent its left end a suitable roller 117 as by a pin or the like 118. The U-shaped element 111a receives the roller 117 adjacent its closed end, and the compressive force of the spring 111 is such as to maintain the U-shaped element 111a in tension thereby urging the rock arm 79 and the rock shaft 78 in a lifting direction. The spring seat 110 is so adjusted on the rod 107 that the compressive force exerted by the spring 111 is sufficient to maintain the cutter bar assembly 52 in floating relationship with respect to the horizontal when the mower assembly 35 is operatively positioned with respect thereto. It will be appreciated that when the cutter bar assembly 52 and the drag bar 43 are swung rearwardly into a "break-away" position that the relationship between the spring arrangement 103 and the cutter bar assembly 52 and drag bar 43 will not be changed. This is by reason of the fact that the standard 104 is secured to the casting 46 so as to turn therewith upon the mower assembly's being moved into a "break-away" position. Consequently the spring arrangement 103 is always positioned substantially coplanar with respect to the drag bar 43 and the cutter bar assembly 52 whether the same are in an operative position or in a "break-away" position.

As previously mentioned, the spring seat 110 is adjustable on the rod 107 so that the compressive force exerted by the spring 111 is capable of adjustment. This is effected in the present instance by means of a pin 118a which is received by the cap 108 and the rod 107 so as to rigidly fix the cap 108 to the rod 107. Therefore, by the use of a suitable wrench, the cap 108 can be turned in either direction which in turn turns the rod 107, which changes the position of the seat 110 axially on the rod 107 varying the pressure thereby of the spring 111 so as to achieve the desired balance of the cutter bar assembly 52.

Figure 9:
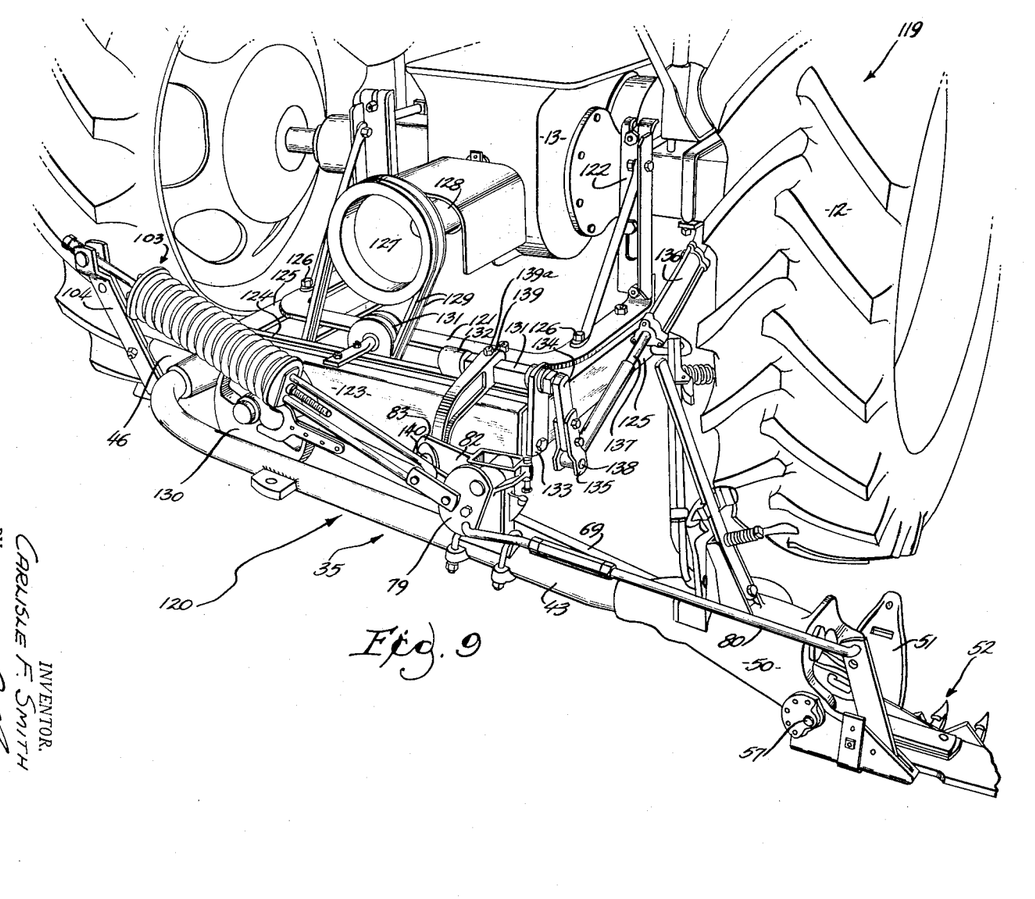
Fig. 9 is a right-rear elevational view of a tractor mounted mower in combination with a tractor, with parts removed, showing a modification of the present invention.

In the form of the invention shown in Fig. 9, a modification is disclosed wherein a tractor 119 is shown in combination with a mower 120. The tractor 119 in the present instance includes the rear traction wheels 12 as described with respect to the previously described tractor 11 as well as the rear axle assembly 13. However, the tractor in this instance is provided with a rearwardly extending substantially U-shaped drawbar 121 which is rigidly secured to the rear axle assembly by means of suitable supporting clamps 122 of any well known construction.

In the mower 120, the mower assembly is identical in construction to the mower assembly of the previously described embodiment and will be identified by the same number 35. The main supporting frame however is formed in the present instance of a pair of channel irons 123 and 124 which are rigidly interconnected so as to form a box like structure by means of forwardly extending rigid elements 125, these elements 125 being rigidly secured to the fore-and-aft extending portions of the drawbar 121 as by the bolts 126. The casting 46 is suitably secured to the rear left end of the main supporting frame for providing both horizontal and vertical movement for the main supporting frame 35 in a manner as previously described, there being upper and lower brackets 126a and 126b, see Fig. 10, fixed on channel portion 123 and supporting a pin identical with pin 49 of Fig. 1 and therefore having the same number. The same counterbalancing arrangement 103 is also provided between the standard 104 and the rock arm 79 for counterbalancing the mower assembly 52. A double-face driving pulley 127, provided with a coupling element 128, is received on the end of the power take-off shaft of the tractor, and is drivingly connected by means of a pair of V-belts 129 to a driven double-face pulley 129a, Fig. 10, in vertical alignment with respect to pulley 127, the driven pulley being drivingly carried by a driven shaft 129b rotatably supported in the main supporting frame so that the driven pulley is in vertical alignment with respect to the pulley 127. The driven shaft extends rearwardly of the main supporting frame and drivingly carries adjacent the end thereof a crank 130 Fig. 9 which is positioned in close proximity to channel 123, the crank 130 being connected to the mower assembly 52 by means of the pitman 69 in a manner as previously described. An idler pulley 131 is carried by the channels 123 and 124 in vertical alignment with respect to the pulley 127 for maintaining the V-belts 129 in power transmitting relationship.

In view of the fact that the drawbar 121 and the main supporting frame of the mower 120 are rigidly fixed with respect to the horizontal, means must be provided for swinging the lifting arm 82 of the lifting mechanism 74 in a lifting direction for effecting vertical swinging movement of the mower assembly 52 and of the drag bar 43 in a manner as previously described. In this modification a rock shaft 131 is rotatably carried in transverse relationship with respect to the direction of travel of the tractor and adjacent the right rear end of the main supporting frame by means of suitable brackets 132 and 133. A rock arm 134 is fixed adjacent the right-end of the rock shaft 131 and is provided adjacent its end with a suitable clevis 135. A hydraulic power motor 136 having a piston rod 137 is conveniently secured adjacent one end to some convenient point on the rear axle assembly 13 the piston rod, adjacent the other end thereof being pivoted by means of a suitable pin 138 to the clevis 135 of the rock arm. The tractor 119 is provided with a suitable hydraulic power system and suitable means, not shown, are provided for extending or retracting the piston rod 137 in a manner well known in the art. A lifting lever 139 is rigidly fixed to the rock shaft 131 and extends rearwardly therefrom, the lifting lever 139 being substantially identical with respect to the lifting lever 89 of the previously described embodiment except that it is fixed on shaft 131 as by means of a screw or the like 139a. A lifting hook 140 is provided and so shaped as to be received in lifting relationship in the hook receiving portion 83 of the rock arm 82 in a manner as previously described. It will be appreciated therefore that when the piston rod 137 is extended so as to rock the rock shaft 131 in a lifting direction, that the lifting lever 139 will also be rocked in a lifting direction until the lifting hook 140 thereof is moved into abutting relationship with respect to the hook receiving portion 83 of the rock arm 82. When the rock shaft 131 is rocked further in a lifting direction, the lifting hook 140 will rock the rock arm 82 in a lifting direction so as to effect vertical swinging of the mower assembly 52 about the axis of pivot pin 57 in a manner as previously described. Further rocking of the rock shaft 131 in a lifting direction, when mower assembly 52 has been moved into a vertically inclined position a predetermined amount, will effect vertical swinging of the drag bar 43 in substantially the same manner as in the previously described embodiment.

Figure 10:
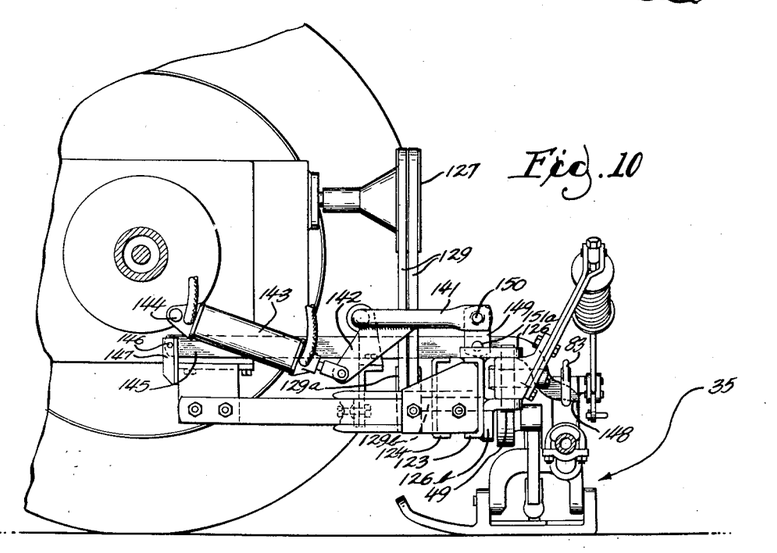
Fig. 10 is a left-side elevational view of a tractor, with parts removed, in combination with a tractor mounted mower showing a further modification of the present invention.

Fig. 10 shows certain further modifications of the structure of Fig. 9. In this modification the main supporting frame is also composed of rigid channel shaped members 123 and 124 which are held in rigid relationship with respect to the U-shaped rearwardly extending drawbar 121. The mower assembly 35 is identical in construction to the mower assembly shown and described in the previously discussed embodiments. The tractor in this instance however is provided with a swingable bail 141 which has formed thereon a depending rock arm 142. A hydraulic power motor 143 is anchored between the lifting arm 142 and some convenient fixed point on the rear axle assembly such as 144 for rocking the swingable bail 141 in a lifting direction when the power motor 143 is extended. A lifting lever 145 is swingably connected by means of a transverse pin 146 to a suitable standard 147 rigidly fixed with respect to the rear axle assembly of the tractor, the lifting lever being provided adjacent its rearward end with a lifting hook 148 which is substantially identical in construction to the lifting hooks 102 and 140 of the previously described embodiments. The lifting lever 145 is of such a size as to position the lifting hook 148 in abutting relationship with the hook receiving portion 83 of the rock arm 82 when the lifting lever 145 is rocked in a lifting direction a predetermined amount. For swinging the lifting lever 145 in a lifting direction a suitable strap 149 is provided which is swingably secured as by pins 150 and 151 between one leg of the swingable bail 143 and the lifting lever 145. Therefore, when the swingable bale 141 is swung in a lifting direction by means of the power motor 143, the lifting lever 145 will be swung in a lifting direction about the axis of pin 146 until the lifting hook 148 is moved into abutting relationship with the hook receiving portion 83 of the rock arm 82. Further swinging of the lifting lever 145 in a lifting direction will rock the arm 82 in a lifting direction so as to effect swinging of the cutter bar assembly to a predetermined vertically inclined position and will rock the drag bar 43 when the mower assembly 52 is moved to its predetermined vertically inclined position. It will be appreciated that by swingably supporting the lifting lever 145 about an axis which is adjacent the rear axle assembly of the tractor that the arc of swinging movement of the lifting hook 148 is such as to remain in lifting relationship with respect to the hook receiving portion 83 of the arm 82 when the lifting lever 145 is raised to its maximum inclined position while still providing for the instantaneous separation of the hook receiving portion 83 from the hook 148 as the mower assembly 35 is moved into its breakaway position. As in the previous embodiments of the invention, the relatively large mass of the frame means 123—124 lies close to or for all practical purposes, in the plane of the sickle and pitman so as to absorb the inertia reactions, while the counterbalancing mechanism is not disabled when the mower "breaks back" about the pin 49, and such "breaking back" occurs freely with respect to the lifting mechanism, which is not necessarily in contact with the mower parts when in operation.

The use of a compression spring of the type shown eliminates a potential source of danger. Large springs break at times, and if a tension spring breaks the parts sometimes fly and endanger persons or property nearby, whereas with the disclosed structure, in such an event the fragments are most likely to remain captive on the U bolt 111a.

It should be understood that it is not intended to limit the invention to particular forms and details described hereinabove and that the invention includes such other forms and modifications as are embraced by the scope of the appended claims.

It is claimed and desired to secure by Letters Patent:

1. In a tractor-mounted mower for use with a tractor having three triangularly spaced rearwardly extending draft arms, said mower comprising a rigid frame carried by said draft arm, said rigid frame being formed of a plate of heavy-gauge sheet-metal, a mower assembly mounted on and swingably carried by said plate adjacent one end thereof, said mower assembly including a cutter bar mechanism adjacent the other end of said plate and having a reciprocating sickle, draft responsive extensible means for holding said mower assembly in operative position with respect to the plate and the direction of travel of the tractor, spaced driving and driven pulleys rotatably carried by said plate, belt means on said pulleys drivingly connecting said driven pulley to said driving pulley, a crank rotatably carried by said plate and drivingly connected to said driven pulley, a pitman carried by and connecting said crank to said sickle for imparting a reciprocatory motion thereto upon rotation of said crank, said crank being so shaped as to lie in close proximity to said plate and said plate lying in a plane substantially parallel to the vertical plane of said pitman, said mower assembly extending rearwardly of said plate and pitman and laterally in close proximity to said pitman.

2. In a mower for use with a tractor of the type characterized by three rearwardly projecting triangularly spaced vertically swingable arms, power lift means for swinging said arms, and a lower drawbar, the combination with said tractor of a platelike frame disposed substantially normal to the direction of travel, and connected to and vertically movable with said spaced arms, mowing mechanism mounted on said frame including a drag bar hingedly connected at one side of said platelike frame for universal swinging movement and extending transversely of the path of travel, to a point beyond the opposite side of said platelike frame, a cutter bar extending beyond said drag bar and including an inner shoe hinged to said drag bar for up and down swinging of said cutter bar relatively to said drag bar, gag mechanism including a lifting arm rockably mounted on said drag bar and connected for swinging said cutter bar upwardly relatively to said drag bar when said lifting arm is raised and a lifting lever connected with said drawbar, extending generally rearwardly through and journaled on said platelike frame and extending beneath said lifting arm, whereby limited upward movement of said platelike frame, through the action of said lifting lever will cause augmented upward movement of said lifting arm and raising of said cutter bar.

3. In a mower for use with a tractor of the type characterized by three rearwardly projecting triangularly spaced vertically swingable arms, power lift means for swinging said arms and a lower drawbar, the combination with said tractor of a platelike frame disposed substantially normal to the path of travel, connected to and vertically movable with said spaced arms, mowing mechanism mounted on said frame including a drag bar hingedly connected at one side of said platelike frame for universal swinging movement and extending transversely of the path of travel, to a point beyond the opposite side of said platelike frame, a cutter bar extending beyond said drag bar and including an inner shoe hinged to said drag bar for up and down swinging of said cutter bar relatively to said drag bar, gag mechanism including a lifting arm rockably mounted on said drag bar and connected for swinging said cutter bar upwardly relatively to said drag bar when said lifting arm is raised stop means positioned to limit the rocking of said lifting arm, and a lifting lever connected with said drawbar, extending generally rearwardly through and journaled on said platelike frame and extending beneath said lifting arm, whereby limited upward movement of said platelike frame, through the action of said lifting lever will cause augmented upward movement of said lifting arm and raising of said cutter bar and of said drag bar at the point where said stop means prevents further rocking of said lifting arm.

4. In a mower for use with a tractor of the type characterized by spaced rearwardly projecting arms constituting a drawbar means, the combination with said tractor of a frame connected to said spaced arms and disposed substantially normal to the direction of travel, mowing mechanism mounted on said frame including a drag bar hingedly connected to said frame at one side thereof for universal swinging movement and extending transversely of the direction of travel, to a point beyond the opposite side of said frame, a cutter bar connected to said drag bar and extending beyond said drag bar and including an inner shoe hinged to said drag bar for up and down swinging of said cutter bar relatively to said drag bar, gag mechanism including a lifting arm rockably mounted on said drag bar and connected for swinging said cutter bar upwardly relatively to said drag bar when said lifting arm is raised, and a lifting lever journaled on said frame, extending generally rearwardly and beneath said lifting arm, and means for causing upward swinging of said lifting lever, whereby upward movement of said lifting lever will cause upward movement of said lifting arm and raising of said cutter bar.

5. In a mower for use with a tractor of the type characterized by rearwardly projecting spaced vertically swingable arms, power lift means for swinging said arms and a power take-off, the combination with said tractor of a platelike frame connected to and vertically movable with said spaced arms and disposed generally normal to the path of travel, mowing mechanism mounted on said frame including a drag bar hingedly connected at one side of said platelike frame for universal swinging movement and extending transversely of the path of travel, to a point beyond the opposite side of said platelike frame, a cutter bar extending beyond said drag bar and including an inner shoe hinged to said drag bar for up and down swinging of said cutter bar relatively to said drag bar, gag mechanism including a lifting arm rockably mounted on said drag bar and connected for swinging said cutter bar upwardly relatively to said drag bar when said lifting arm is raised, a cutter bar actuating crank shaft journaled on said platelike frame, rearwardly of said power take-off, a joint shaft extending between said power take-off and said crankshaft, and a lifting lever connected with said tractor, extending generally rearwardly beyond and journaled on said platelike frame and extending beneath said lifting arm, whereby upward movement of said platelike frame within the limitations of said joint shaft, through the action of said lifting lever, will cause augmented upward movement of said lifting arm and raising of said cutter bar.

6. In a mower for use with a tractor of the type characterized by rearwardly projecting spaced vertically swingable arms and power lift means for swinging said arms, the combination with said tractor of a platelike frame connected to and vertically movable with said spaced arms and disposed generally normal to the path of travel, mowing mechanism mounted on said frame including a drag bar hingedly connected at one side of said platelike frame for universal swinging movement and extending transversely of the path of travel rearwardly of said frame, to a point beyond the opposite side of said platelike frame, a cutter bar extending beyond said drag bar and including an inner shoe hinged to said drag bar for up and down swinging of said cutter bar relatively to said drag bar, gag mechanism including a lifting arm rockably mounted on said drag bar and connected for swinging said cutter bar upwardly relatively to said drag bar when said lifting arm is raised, draft responsive releasable means connected between said tractor and said drag bar for holding said mowing mechanism in operative position but yieldable under excessive stress to allow rearward swinging of said mechanism, and a lifting lever connected at one end with said tractor, extending generally rearwardly beyond and journaled at its mid-portion on said platelike frame and extending beneath said lifting arm, whereby limited upward movement of said platelike frame, through the action of said lifting lever will cause augmented upward movement of said lifting arm and raising of said cutter bar, and whereby said mowing mechanism may swing back free of any interference from said lifting lever.

References Cited in the file of this patent
UNITED STATES PATENTS

| | | |
|---|---|---|
| 2,550,412 | Girardi | Apr. 24, 1951 |
| 2,580,266 | Abgarian | Dec. 25, 1951 |
| 2,637,966 | Richey | May 12, 1953 |
| 2,669,825 | Preble et al. | Feb. 23, 1954 |
| 2,670,583 | Hintz et al. | Mar. 2, 1954 |